United States Patent
Kaliyugavaratharajan et al.

(10) Patent No.: US 11,722,343 B1
(45) Date of Patent: Aug. 8, 2023

(54) RESOLVER INTEGRAL DEMODULATION USING ZERO CROSSING POINTS

(71) Applicant: Hamilton Sundstrand Corporation, Charlotte, NC (US)

(72) Inventors: Sundaram Kaliyugavaratharajan, Karnataka (IN); Ashish Vijay, Rajasthan (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/860,633

(22) Filed: Jul. 8, 2022

(30) Foreign Application Priority Data

May 13, 2022 (IN) .............................. 202211027653

(51) Int. Cl.
H04L 27/06 (2006.01)
(52) U.S. Cl.
CPC ..................................... *H04L 27/06* (2013.01)
(58) Field of Classification Search
CPC ....................................................... H04L 27/06
See application file for complete search history.

(56) References Cited

U.S. PATENT DOCUMENTS

| | | | |
|---|---|---|---|
| 7,135,860 B2 | 11/2006 | Miya et al. | |
| 7,298,967 B2 | 11/2007 | Chen et al. | |
| 7,692,566 B2 | 4/2010 | Inoue | |
| 9,689,717 B2 | 6/2017 | Remillard et al. | |
| 11,092,464 B2 | 8/2021 | Hess et al. | |
| 11,177,987 B1 * | 11/2021 | Jefremow | H04L 27/08 |

* cited by examiner

*Primary Examiner* — Rahel Guarino
(74) *Attorney, Agent, or Firm* — Cantor Colburn LLP (57) ABSTRACT

Examples described herein provide a method that includes storing, in a first buffer associated with a first ADC of a DSP, resolver sine values collected from first, second, and third resolvers. The method further includes storing, in a second buffer associated with a second ADC of the DSP, resolver cosine values collected from the first, second, and third resolvers. The method further includes storing, in a third buffer associated with a third ADC of the DSP, resolver excitation values collected from the first, second, and third resolvers. The method further includes determining a midpoint value of the resolver excitation values, determining a sine amplitude based at least in part on the resolver sine values and the midpoint value, and determining a cosine amplitude based at least in part on the resolver sine values and the midpoint value. The method further includes identifying a quadrant of a resolver position.

16 Claims, 7 Drawing Sheets

RESOLVER INTEGRAL DEMODULATION USING ZERO CROSSING POINTS

CROSS-REFERENCE TO RELATED APPLICATIONS

This application claims priority to Indian Provisional Patent Application No. 202211027653 filed May 13, 2022, the disclosure of which is incorporated herein by reference in its entirety.

BACKGROUND

The subject matter disclosed herein generally relates to signal processing and, more particularly, to resolver integral demodulation using zero crossing points.

A resolver, also referred to as a motor resolver, is an electrical transformer that measures angle of rotation. Resolvers are made up of a rotor and a stator. The rotor is mounted on a shaft of a device (e.g., motor, turbine engine, etc.) to be monitored, for example. The stator includes multiple transformers (also referred to as "windings"), for example, an input transformer and two output transformers. As an input signal (also referred to as a "reference" signal or an "excitation" signal) is applied to the input transformer, one of the output transformers generates a sine output and the other of the output transformers generates a cosine output.

BRIEF DESCRIPTION

In one exemplary embodiment, a method is provided. The method includes storing, in a first buffer associated with a first analog to digital converter (ADC) of a digital signal processor (DSP), resolver sine values collected from a first resolver, a second resolver, and a third resolver. The method further includes storing, in a second buffer associated with a second ADC of the DSP, resolver cosine values collected from the first resolver, the second resolver, and the third resolver. The method further includes storing, in a third buffer associated with a third ADC of the DSP, resolver excitation values collected from the first resolver, the second resolver, and the third resolver. The method further includes determining a midpoint value of the resolver excitation values. The method further includes determining a sine amplitude based at least in part on the resolver sine values and the midpoint value. The method further includes determining a cosine amplitude based at least in part on the resolver sine values and the midpoint value. The method further includes identifying a quadrant of a resolver position.

In addition to one or more of the features described herein, or as an alternative, further embodiments of the method may include determining a quadrant position based at least in part on the quadrant.

In addition to one or more of the features described herein, or as an alternative, further embodiments of the method may include that the resolver sine values, the resolver cosine values, and the resolver excitation values are collected simultaneously.

In addition to one or more of the features described herein, or as an alternative, further embodiments of the method may include that the resolver sine values, the resolver cosine values, and the resolver excitation values are collected relative to a zero crossing.

In addition to one or more of the features described herein, or as an alternative, further embodiments of the method may include that the resolver sine values, the resolver cosine values, and the resolver excitation values are collected relative to a zero crossing for a half period.

In addition to one or more of the features described herein, or as an alternative, further embodiments of the method may include that identifying the quadrant of the resolver position includes doubling the sine amplitude and the cosine amplitude.

In addition to one or more of the features described herein, or as an alternative, further embodiments of the method may include that identifying the quadrant is based on a sign of an excitation signal applied to the first resolver, the second resolver, and the third resolver.

In addition to one or more of the features described herein, or as an alternative, further embodiments of the method may include that the first buffer is a first circular buffer, wherein the second buffer is a second circular buffer, and wherein the third buffer is a third circular buffer.

In another exemplary embodiment a digital signal processor (DSP) includes a first analog to digital converter (ADC) having a first buffer associated therewith, the first buffer storing resolver sine values collected from a first resolver, a second resolver, and a third resolver. The DSP further includes a second ADC having a second buffer associated therewith, the second buffer storing resolver cosine values collected from the first resolver, the second resolver, and the third resolver. The DSP further includes a third ADC having a third buffer associated therewith, the third buffer storing resolver excitation values collected from the first resolver, the second resolver, and the third resolver. The DSP further includes a first integrator to determine a sine amplitude based at least in part on the resolver sine values and a midpoint of a resolver excitation signal. The DSP further includes a second integrator to determine a cosine amplitude based at least in part on the resolver cosine values and the midpoint of the resolver excitation signal. The DSP further includes a quadrant identifier to identifies a quadrant of a resolver position based at least in part on the sine amplitude and the cosine amplitude.

In addition to one or more of the features described herein, or as an alternative, further embodiments of the DSP may include an angle determining module to determine a quadrant position based at least in part on the quadrant.

In addition to one or more of the features described herein, or as an alternative, further embodiments of the DSP may include that the resolver sine values, the resolver cosine values, and the resolver excitation values are collected simultaneously.

In addition to one or more of the features described herein, or as an alternative, further embodiments of the DSP may include that the resolver sine values, the resolver cosine values, and the resolver excitation values are collected relative to a zero crossing.

In addition to one or more of the features described herein, or as an alternative, further embodiments of the DSP may include that the resolver sine values, the resolver cosine values, and the resolver excitation values are collected relative to a zero crossing for a half period.

In addition to one or more of the features described herein, or as an alternative, further embodiments of the DSP may include that identifying the quadrant of the resolver position includes doubling the sine amplitude and the cosine amplitude.

In addition to one or more of the features described herein, or as an alternative, further embodiments of the DSP may include that the quadrant identifier identifies the quadrant based on a sign of an excitation signal applied to the first resolver, the second resolver, and the third resolver.

In addition to one or more of the features described herein, or as an alternative, further embodiments of the DSP may include that the first buffer is a first circular buffer, wherein the second buffer is a second circular buffer, and wherein the third buffer is a third circular buffer.

Other embodiments described herein implement features of the above-described method in computer systems and computer program products.

The above features and advantages, and other features and advantages, of the disclosure are readily apparent from the following detailed description when taken in connection with the accompanying drawings.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc.

The terms "a plurality" are understood to include any integer number greater than or equal to two, i.e. two, three, four, five, etc. The term "connection" can include an indirect "connection" and a direct "connection."

Figure 1A:
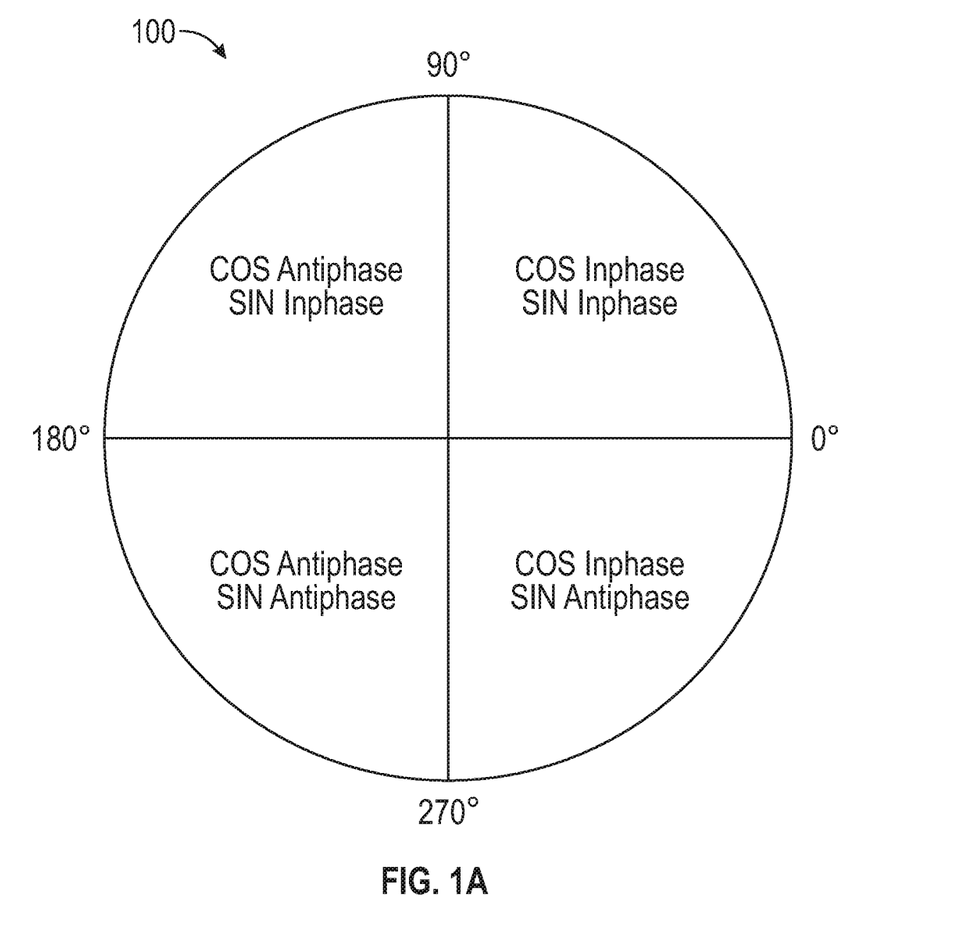
FIGS. 1A-1C show the resolver quadrants and the sign of the feedback signals in each quadrant according to one or more embodiments described herein.
Figure 1B:
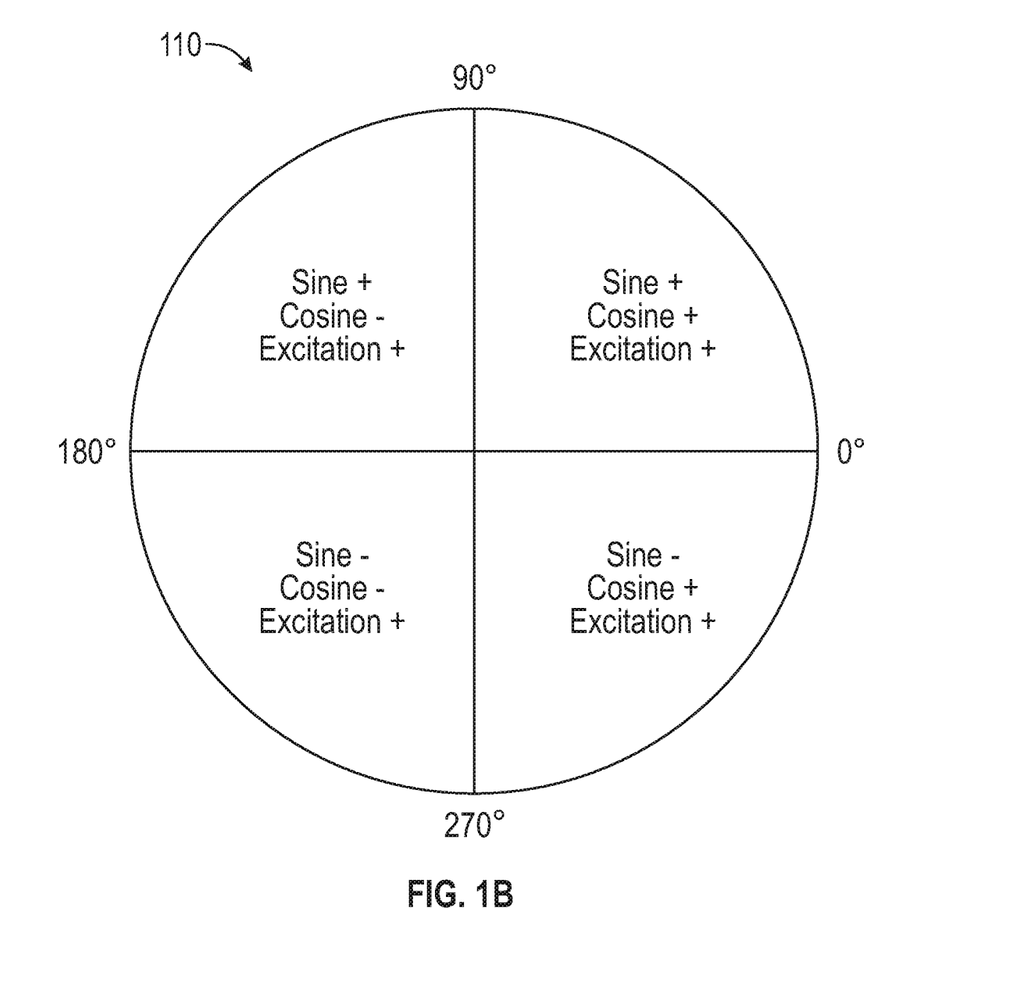
Figure 1C:
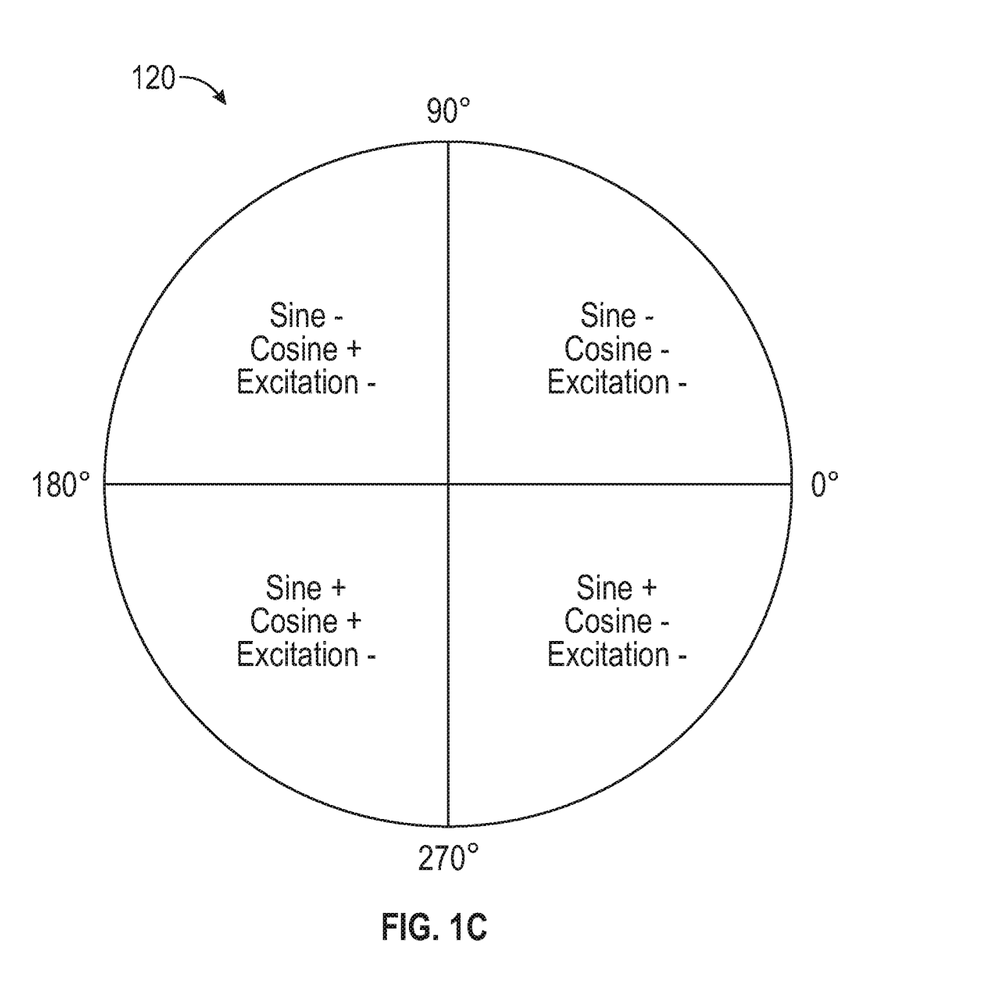

Turning to an overview of technologies that are more specifically relevant to aspects of the present disclosure, a resolver or multiple resolvers can be used to measure rotation, such as of a motor, turbine engine, etc. In some cases, three resolvers may be used. Resolvers are excited with an excitation signal. The resolver provides three analog feedback signals, which take the form of sinusoids, as follows: the excitation signal, a sine signal, and a cosine signal. Demodulation of the resolver sine and cosine signals is utilized in many signal processing applications. In the demodulation of the resolver sine and cosine signals, a quadrant of the resolver position is determined based on the signs of the excitation, sine, and cosine signals. FIGS. 1A-1C show the resolver quadrants and the sign of the feedback signals in each quadrant. Particularly, FIG. 1A depicts a graphical representation 100 of resolver signals phase relationships across four quadrants. FIG. 1B depicts a graphical representation 110 of resolver signals phase relationships across four quadrants where the amplitude of the excitation signal is positive (i.e., greater than zero). FIG. 1C depicts a graphical representation 120 of resolver signals phase relationships across four quadrants where the amplitude of the excitation signal is negative (i.e., less than zero).

Many existing demodulation algorithms for determining a quadrant of the resolver position are time consuming, resource intensive, and/or inaccurate. Conventionally, the feedback signals are fed into the three separate analog to digital converters (ADCs), and the digitally converted data from the ADCs is fed into a digital signal processor (DSP). More particularly, resolver feedback signals sample data are collected into buffers, such as one buffer per resolver (e.g., three buffers for three resolvers): one for the excitation signal (ExcitationRAMBuffer), one for sine signal (SineRAMBuffer), and one for cosine signal (CosineRAMBuffer). These buffers are used to demodulate the feedback signals and determine the rotational position of the resolver. Once a required number of samples are collected, the resolver signal demodulation is performed using an integral demodulation algorithm. The integral demodulation is performed by integrating at least one full period of the sine and cosine feedback samples rectified about their respective midpoints and calculating the angular position using trigonometric relationships and the excitation reference to determine the quadrant of the angular position. This approach has several disadvantages. First, to determine a more accurate resolver position, each of the three feedback signals must be sampled simultaneously; however, conventional approaches acquire the three feedback signals using three different ADCs. This results in a phase delay of minimum one sample and hence produces less accurate results. Second, this approach uses more processing time/resources for the integral demodulation and quadrant determination because the resolver signals integration is done for the full period of the feedback signals and because each excitation sample is compared to identify the quadrant information.

Figure 2:
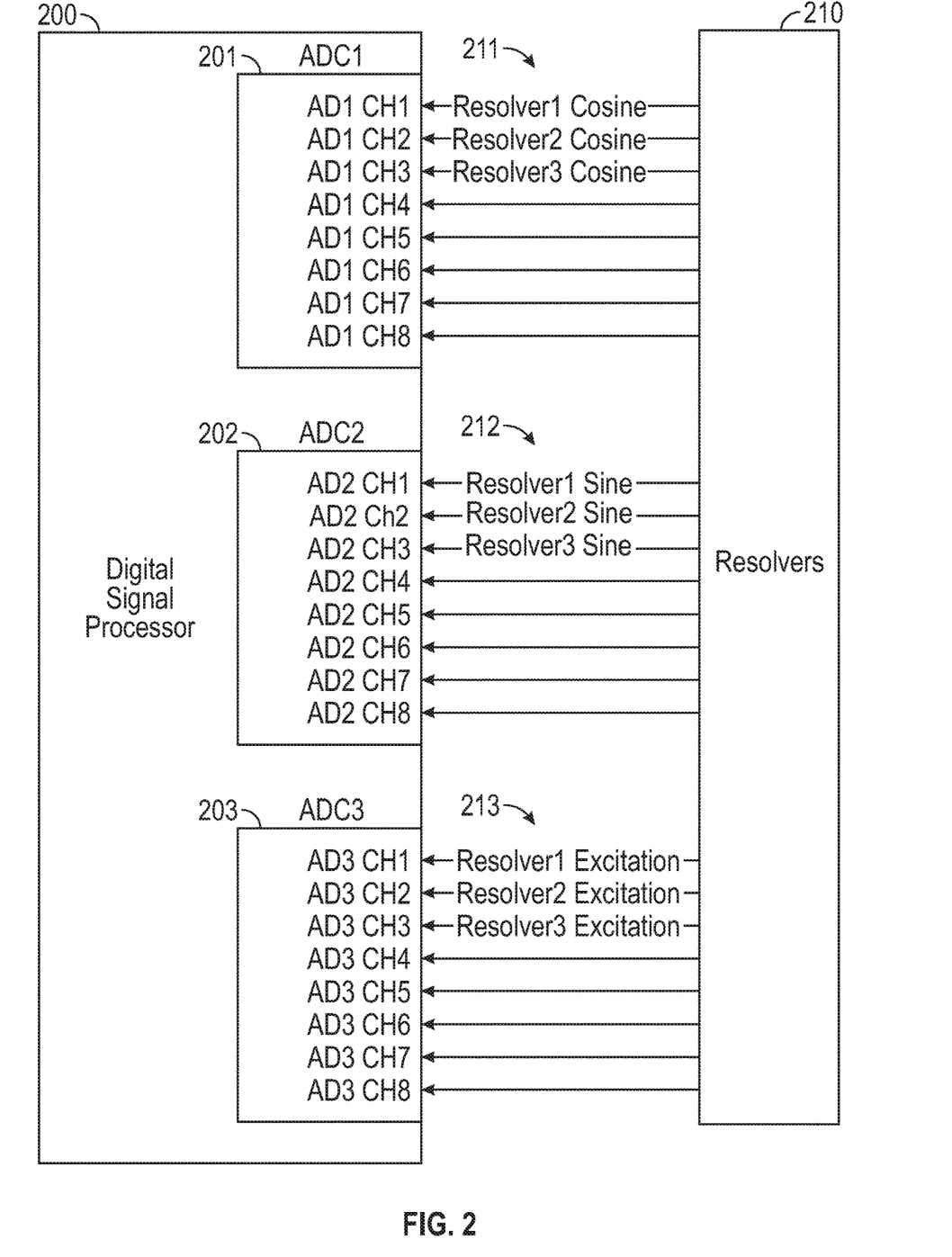
FIG. 2 depicts an example of a digital signal processor that includes three analog to digital converters according to one or more embodiments described herein.

One or more embodiments described herein address these and other shortcomings by implementing a DSP with internal ADCs for each of the three resolver feedback signals (e.g., excitation, sine, and cosine) simultaneously. FIG. 2 depicts an example of a digital signal processor 200 that includes three ADCs: ADC1 201, ADC2 202, and ADC3 203. In this example, each of the ADCs 201-203 receive respective cosine, sine, and excitation signals from resolvers 210, which may represent multiple (e.g., three) resolvers. For example, the ADC1 201 receives resolver cosine signals 211 from the resolvers 210 (e.g., resolver1 cosine, resolver2 cosine, and resolver3 cosine); the ADC2 202 receives resolver sine signals 212 from the resolvers 210 (e.g., resolver1 sine, resolver2 sine, and resolver3 sine); and the ADC3 203 receives resolver excitation signals 213 from the resolvers 210 (e.g., resolver1 excitation, resolver2 excitation, and resolver3 excitation). Each of the ADCs 201-203 includes an integral or associated buffer (e.g., a random access memory (RAM) buffer) for storing sample data from the feedback signals, and the DSP is capable of detecting zero crossings for the feedback signals. This is shown in FIG. 3, which is now described.

Figure 3:
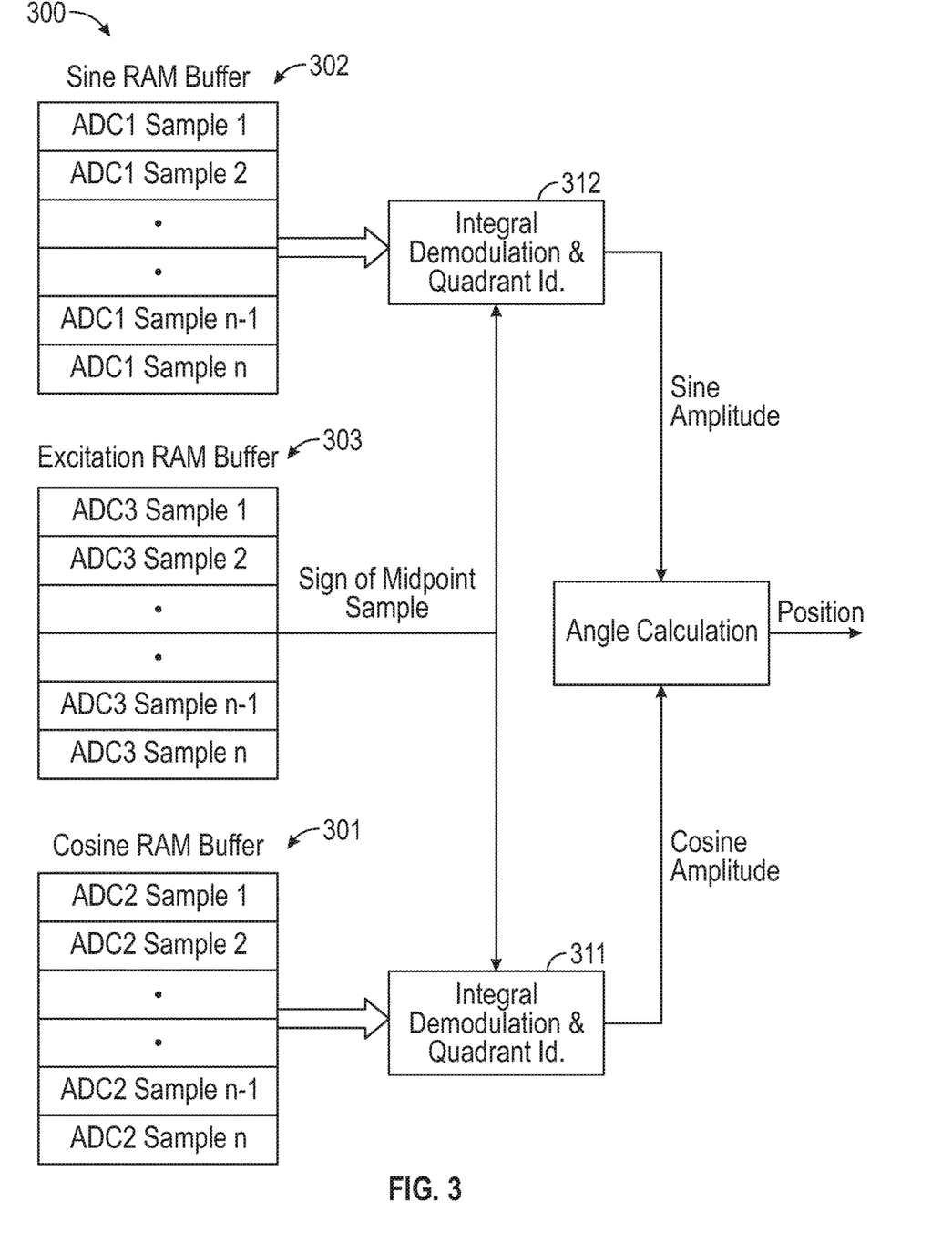
FIG. 3 depicts a flow diagram of a method for determining resolver position according to one or more embodiments described herein.

Particularly, FIG. 3 depicts a flow diagram of a method 300 for determining resolver position according to one or more embodiments described herein. In FIG. 3, each of the buffers are shown. Particularly, a cosine RAM buffer 301 (associated with the ADC1 201) stores resolver cosine sample data, a sine RAM buffer 302 (associated with the ADC2 202) stores resolver sine sample data, and an excitation RAM buffer 303 (associated with the ADC3 203) stores resolver excitation sample data.

Data from the cosine RAM buffer 301 is fed into a first integral demodulation and quadrant identification block 311 along with a sign of a midpoint of a sample from the excitation RAM buffer 303. The first integral demodulation and quadrant identification block 311 determines and outputs a cosine amplitude into an angle calculation block 320.

Similarly, data from the sine RAM buffer 302 is fed into a second integral demodulation and quadrant identification block 312 along with the sign of a midpoint of a sample from the excitation RAM buffer 303. The second integral demodulation and quadrant identification block 312 determines and outputs a sine amplitude into the angle calculation block 320.

More particularly, the first and second integral demodulation and quadrant identification blocks 311, 312 respectively integrate half periods of the cosine and sine feedback samples. Once a threshold number of samples are collected, resolver signal demodulation is performed using an integral demodulation approach. Pseudcode of an example of such an integral demodulation approach is as follows:

if (excBuffer[midpoint]>MidpointADC):
    For each sample (i) in numSamples:

sin Sum+=(sin Buffer[$i$])

cos Sum+=(cos Buffer[$i$])

else:
    For each sample (i) in numSamples:

sin Sum+=(−sin Buffer[$i$])

cos Sum+=(−cos Buffer[$i$])

SineSum=2×SineSum
CosineSum=2×CosineSum

The angle calculation block 320 determines an angle of the device being evaluated (e.g., a shaft of a motor, turbine engine, etc.).

According to one or more embodiments described herein, the first and second integral demodulation and quadrant identification blocks 311, 312 and/or the angle calculation block 320 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, one or more of the components described herein can be a combination of hardware and programming The programming can be processor executable instructions stored on a tangible memory, and the hardware can include the processing device for executing those instructions. Thus a system memory can store program instructions that when executed by the processing device implement the engines described herein. Other engines can also be utilized to include other features and functionality described in other examples herein.

Figure 4:
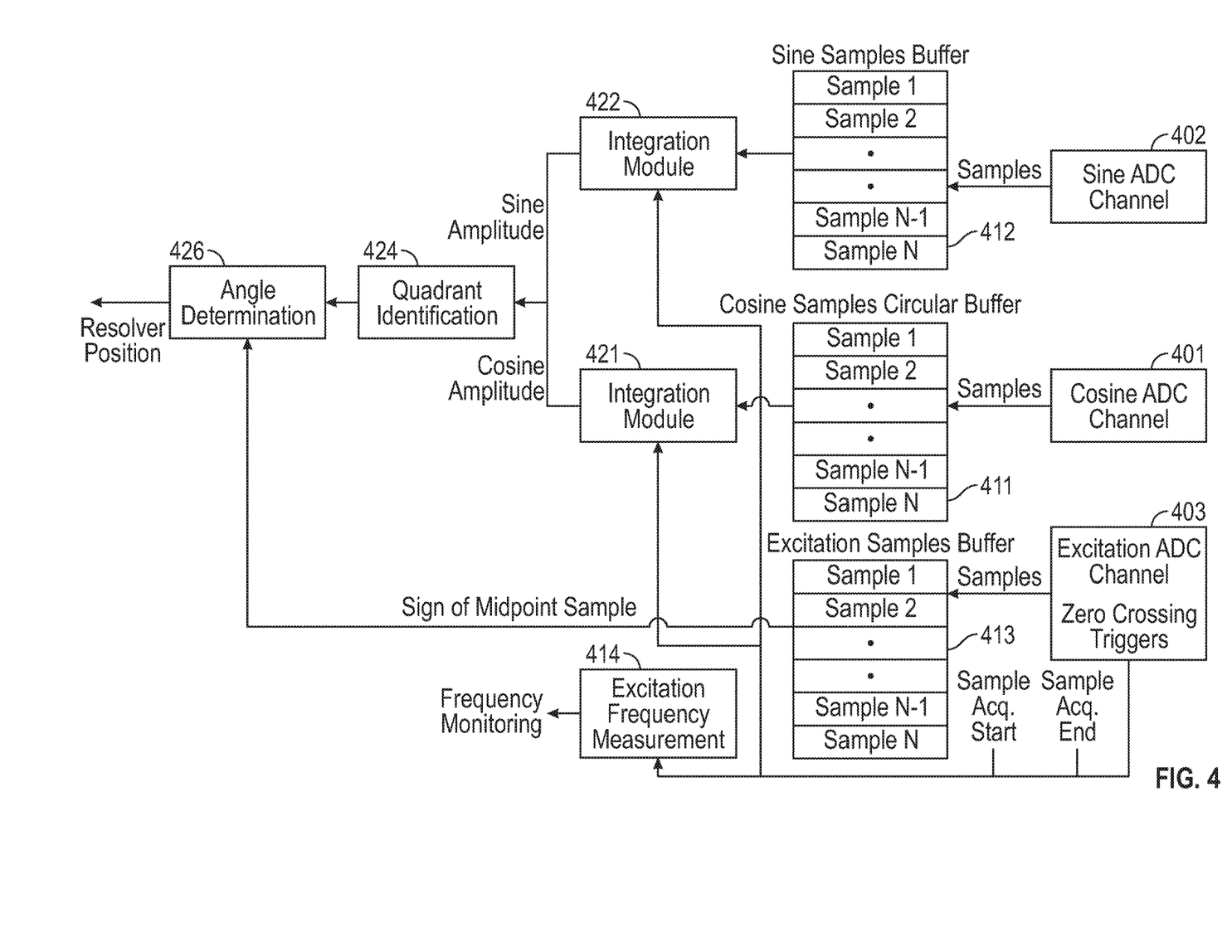
FIG. 4 depicts a flow diagram of a method for determining resolver position according to one or more embodiments described herein.

FIG. 4 depicts a flow diagram of a method 400 for determining resolver position according to one or more embodiments described herein. In this example, the method 400 performs feedback sample data acquisition using zero crossing points and quadrant identification using the excitation signal.

Cosine ADC channel 401, sine ADC channel 402, and excitation ADC channel 403 feed buffers 411, 412, 413 respectively with sample data acquired from the feedback signals. In this example, the buffers 411-413 are circular buffers, although other types of buffers can be implemented. The sample data acquired by the excitation ADC channel 403 can also feed an excitation frequency measurement block 414 that outputs a frequency monitoring signal.

A first integration module 421 uses the zero crossing triggers from the excitation ADC channel 403 and sample data from the buffer 411 to determine a cosine amplitude. Similarly, a second integration module 422 uses the zero crossing triggers from the excitation ADC channel 403 and sample data from the buffer 412 to determine a sine amplitude.

A quadrant identification block 424 determines, based on the sine amplitude and the cosine amplitude, a quadrant of the resolver (see, e.g., FIGS. 1A-1C). An angle determination module 426 uses the identified quadrant to determine a resolver position.

According to one or more embodiments described herein, the excitation frequency measurement 414, the integration module 421, the integration module 422, the quadrant identification 424, and/or the angle calculation 426 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, one or more of the components described herein can be a combination of hardware and programming The programming can be processor executable instructions stored on a tangible memory, and the hardware can include the processing device for executing those instructions. Thus a system memory can store program instructions that when executed by the processing device implement the engines described herein. Other engines can also be utilized to include other features and functionality described in other examples herein.

Figure 5:
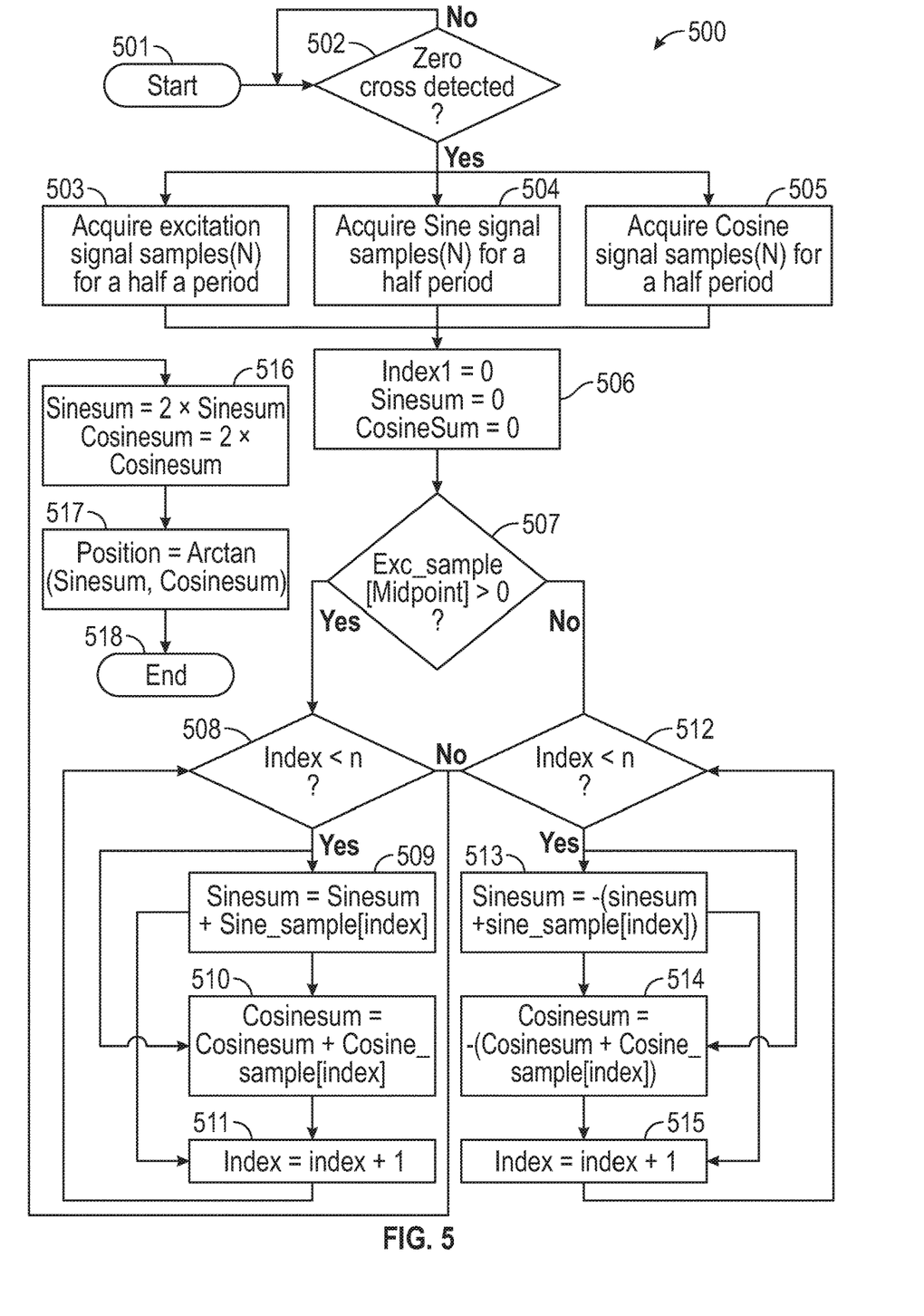
FIG. 5 depicts a flow diagram of a method for performing integral demodulation using a zero crossing point of the excitation signal according to one or more embodiments described herein.

FIG. 5 depicts a flow diagram of a method 500 for performing integral demodulation using a zero crossing point of the excitation signal according to one or more embodiments described herein. The method starts at block 501 and proceeds to decision block 502, where it is determined (such as by the DSP 200 and/or one or more of the ADCs 201-203) whether a zero crossing is detected. This determination repeats until a zero crossing is detected at which point the method 500 proceeds to blocks 503, 504, 505. At block 503, excitation signal samples are acquired, such as for a half period. At block 504, sine signal samples are acquired, such as for a half period. At block 505, cosine signal samples are acquired, such as for a half period. The method 500 proceeds to block 506, where values for "index1," "sine sum," and "cosine sum" are set to zero.

The method 500 proceeds to decision block 507 where it is determined whether the excitation sample midpoint is positive (i.e., greater than zero). If it is determined at decision block 507 that the excitation sample midpoint is positive, the method 500 proceeds to decision block 508, where it is determined whether the index (e.g., "index1" from block 506) is less than a value n. If so, the method 500 proceeds to blocks 509 and 510. At block 509, a value Sinesum is set to a previous Sinesum value plus a sine sample for the current index. Similarly, at block 510, a value Cosinesum is set to a previous Cosinesum value plus a cosine sample for the current index. After blocks 509, 510, the method 500 proceeds to block 511 where the index is incremented and the method 500 returns to decision block 508.

Returning to the decision block 507, if it is determined at decision block 507 that the excitation sample midpoint is not positive, the method 500 proceeds to decision block 512, where it is determined whether the index (e.g., "index1" from block 506) is less than a value n. If so, the method 500 proceeds to blocks 513 and 514. At block 513, a value Sinesum is set to the negative (opposite) of a quantity represented by a previous Sinesum value plus a sine sample for the current index. Similarly, at block 514, a value Cosinesum is set to the negative (opposite) of a quantity represented by a previous Cosinesum value plus a cosine sample for the current index. After blocks 513, 514, the method 500 proceeds to block 515 where the index is incremented and the method 500 returns to decision block 512.

If, at decision block 508 and/or if at decision block 512 it is determined that the index is not less than the value n, the method 500 proceeds to block 512 where the SineSum and CosineSum values are calculated, respectively, by doubling the previous SineSum and CosineSum values.

At block 517, the position is determined using the SineSum and CosineSum values from block 516. For example, the position is determined using the arctan of the SineSum and CosineSum values from block 516. The method 500 then ends at block 518.

Additional processes also may be included, and it should be understood that the process depicted in FIG. 5 represents an illustration, and that other processes may be added or existing processes may be removed, modified, or rearranged without departing from the scope of the present disclosure.

It is understood that one or more embodiments described herein is capable of being implemented in conjunction with any other type of computing environment now known or later developed.

One or more embodiments described herein provide improvements over conventional approaches for demodulation algorithms for determining a quadrant of the resolver position. For example, according to one or more embodiments described herein, the excitation signal is sinusoidal, which has three zero crossing points per full cycle; hence, the signal frequency can be calculated as the number of zero crossing points per second divided by three.

One or more embodiments described herein also provide improved accuracy. For example, in conventional approaches, because of the external ADC arrangement, each of the resolver signals (excitation, sine and cosine) are not sampled simultaneously. At least one sample delay is introduced between the samples and hence the sine to cosine ratio is not accurately represented. In contrast, one or more embodiments described herein sample the three resolver signals simultaneously using three ADCs that are in-built to processor (e.g., DSP). As the processors are running in Mhz frequency, the phase delay between the signals will only be the order of microseconds. Hence the sine to cosine ratio is accurately represented.

One or more embodiments described herein also provide improved processor (e.g., DSP) utilization. To calculate the amplitude, conventional approaches process samples for a full period of the signal which is time consuming. Also such approaches use each excitation sample to identify the quadrant of sine and cosine feedback signals. In contrast, one or more embodiments described herein collect samples from a zero crossing point such that samples only for a half period need to be integrated, and the integral output is multiplied by two to get the amplitude. Also the quadrant of the sine and cosine can be identified using only the sign of excitation signal that corresponds to the midpoint value of the excitation signal.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

What is claimed is:

1. A method comprising:
    storing, in a first buffer associated with a first analog to digital converter (ADC) of a digital signal processor (DSP), resolver sine values collected from a first resolver, a second resolver, and a third resolver;
    storing, in a second buffer associated with a second ADC of the DSP, resolver cosine values collected from the first resolver, the second resolver, and the third resolver;
    storing, in a third buffer associated with a third ADC of the DSP, resolver excitation values collected from the first resolver, the second resolver, and the third resolver;
    determining a midpoint value of the resolver excitation values;
    determining a sine amplitude based at least in part on the resolver sine values and the midpoint value;
    determining a cosine amplitude based at least in part on the resolver sine values and the midpoint value; and
    identifying a quadrant of a resolver position.

2. The method of claim 1, further comprising determining a quadrant position based at least in part on the quadrant.

3. The method of claim 1, wherein the resolver sine values, the resolver cosine values, and the resolver excitation values are collected simultaneously.

4. The method of claim 1, wherein the resolver sine values, the resolver cosine values, and the resolver excitation values are collected relative to a zero crossing.

5. The method of claim 1, wherein the resolver sine values, the resolver cosine values, and the resolver excitation values are collected relative to a zero crossing for a half period.

6. The method of claim 1, wherein identifying the quadrant of the resolver position comprises doubling the sine amplitude and the cosine amplitude.

7. The method of claim 1, wherein identifying the quadrant is based on a sign of an excitation signal applied to the first resolver, the second resolver, and the third resolver.

8. The method of claim 1, wherein the first buffer is a first circular buffer, wherein the second buffer is a second circular buffer, and wherein the third buffer is a third circular buffer.

9. A digital signal processor (DSP) comprising:
    a first analog to digital converter (ADC) having a first buffer associated therewith, the first buffer storing resolver sine values collected from a first resolver, a second resolver, and a third resolver;
    a second ADC having a second buffer associated therewith, the second buffer storing resolver cosine values collected from the first resolver, the second resolver, and the third resolver;
    a third ADC having a third buffer associated therewith, the third buffer storing resolver excitation values collected from the first resolver, the second resolver, and the third resolver;
    a first integrator to determine a sine amplitude based at least in part on the resolver sine values and a midpoint of a resolver excitation signal;
    a second integrator to determine a cosine amplitude based at least in part on the resolver cosine values and the midpoint of the resolver excitation signal; and
    a quadrant identifier to identifies a quadrant of a resolver position based at least in part on the sine amplitude and the cosine amplitude.

10. The DSP of claim 9, further comprising an angle determining module to determine a quadrant position based at least in part on the quadrant.

11. The DSP of claim 9, wherein the resolver sine values, the resolver cosine values, and the resolver excitation values are collected simultaneously.

12. The DSP of claim 9, wherein the resolver sine values, the resolver cosine values, and the resolver excitation values are collected relative to a zero crossing.

13. The DSP of claim 9, wherein the resolver sine values, the resolver cosine values, and the resolver excitation values are collected relative to a zero crossing for a half period.

14. The DSP of claim 9, wherein identifying the quadrant of the resolver position comprises doubling the sine amplitude and the cosine amplitude.

15. The DSP of claim 9, wherein the quadrant identifier identifies the quadrant based on a sign of an excitation signal applied to the first resolver, the second resolver, and the third resolver.

16. The DSP of claim 9, wherein the first buffer is a first circular buffer, wherein the second buffer is a second circular buffer, and wherein the third buffer is a third circular buffer.

* * * * *